No. 768,870.

Patented August 30, 1904.

UNITED STATES PATENT OFFICE.

GEORGE H. TURNBULL, OF OKLAHOMA, OKLAHOMA TERRITORY.

COMPOSITION OF MATTER.

SPECIFICATION forming part of Letters Patent No. 768,870, dated August 30, 1904.

Application filed May 9, 1904. Serial No. 207,061. (No specimens.)

*To all whom it may concern:*

Be it known that I, GEORGE H. TURNBULL, a citizen of the United States, residing at Oklahoma city, in the county of Oklahoma and Territory of Oklahoma, have invented new and useful Improvements in Compositions of Matter, of which the following is a specification.

My invention relates to compositions which are to be applied to the surface of timber, brick, cement, or other materials, and more especially to liquid compositions or coatings which are adapted to be applied while in a liquid condition to these surfaces for the purpose of forming a base or backing to which may be added sand, gravel, or other similar substances, which become set within the composition upon its hardening and furnish a roughened surface upon which a safe and positive footing may be had.

More especially this composition is adapted for use in pens, chutes, runways, and the like in stock-cars, loading-stations and stock-yards, wherever it is desirable to guard against slipping of stock and the attendant excitement of the animals in handling the same. Whereever there is need of a sure and safe footing for the animals in handling them or in transportation, this composition is extremely valuable, since by applying the same to the surface of car-floors or to the surface of any incline all danger of sliding and slipping is prevented.

The use of this composition is of course not confined to that above set out, but it may be employed in many other ways, such as in garden walks or pathways, and most advantageously wherever there is any appreciable incline.

The liquid composition is composed of Moline, Cincinnati, or other suitable pitch, oil-tar, and tallow. These ingredients are generally used in the proportions of one barrel of pitch, ten gallons of oil-tar, and ten pounds of the tallow. The pitch is heated, and the oil-tar and tallow then added, the whole being thoroughly mixed and stirred to give a homogeneous mass. The proportions, of course, of these ingredients of the liquid composition may be varied, but those set out have been found most desirable. While in their heated conditions the ingredients become thoroughly incorporated throughout the mass and the mixture is then applied to the desired surface with a brush or other suitable means. Upon this backing formed by the application of this liquid coating, while the same is in a melted condition, there is tamped or beaten lightly into the same a coating of fine gravel, over which is spread a light covering or sprinkling of sand. After allowing the composition to cool the surplus sand and gravel are swept off, the main portion of the gravel being incorporated in the liquid coating upon its hardening. This process leaves a surface which offers a firm footing and upon which there is no danger of slipping, as the gravel forms a roughened surface upon the boards, brick, or cement structure to which the coating has been applied.

Slight departures from the exact composition of the coating herein set out may be introduced without departing from the spirit of the present invention, which contemplates a composition composed generally in the manner set forth.

What is claimed, therefore, and desired to be protected by Letters Patent of the United States, is—

1. A liquid coating comprising pitch, oil-tar, and tallow, in combination with a coating of sand and gravel adapted to be applied to brick, cement, wood, and other surfaces, substantially as described.

2. In a coating of the character described, pitch, oil-tar, and tallow combined in the proportions set out, adapted to be applied while hot to a desired surface, a covering of fine gravel set therein, and a slight coating of sand, said coating when hardened forming a roughened covering upon the surface to which it has been applied.

3. In combination, a liquid coating comprising pitch, oil-tar, and tallow, and a layer of gravel set therein, adapted to form a roughened covering for brick, wood, cement and other surfaces, substantially as described.

4. A composition of the character described comprising a liquid coating consisting of pitch, oil-tar, and tallow adapted to be applied in a heated condition to the surface of a wooden, brick or cement structure, and a material set therein to offer a rough upper face upon said coating upon the hardening of the same.

5. A composition for covering the floors of cars, pens, chutes and the like, comprising pitch, oil-tar, and tallow, thoroughly incorporated by heating, and applied in a heated condition to said surfaces, and an upper layer of gravel added thereto and set within the same upon hardening of the mixture, substantially as set forth.

6. The herein-described process of treating the surfaces of boards, brick or cement structures, consisting in applying to the same a backing comprising a mixture of pitch, oil-tar and tallow in a heated condition, and then incorporating in said backing a layer of friction-producing material giving a roughened upper facing upon said backing.

In testimony whereof I have signed my name to this specification in the presence of two subscribing witnesses.

GEORGE H. TURNBULL.

Witnesses:
S. HUDSON HARRELSON,
M. E. HIGHLEY.